United States Patent [19]

Fattic et al.

[11] Patent Number: 4,601,197

[45] Date of Patent: Jul. 22, 1986

[54] PEAK COMBUSTION PRESSURE TIMING DETECTOR FOR INTERNAL COMBUSTION ENGINE

[75] Inventors: Gerald T. Fattic; David S. Dennis; William J. Ricketts, all of Anderson, Ind.

[73] Assignee: General Motors Corporation, Detroit, Mich.

[21] Appl. No.: 754,431

[22] Filed: Jul. 12, 1985

[51] Int. Cl.[4] .......................................... G01M 15/00
[52] U.S. Cl. .................................................... 73/117.3
[58] Field of Search ............... 73/117.3, 115; 324/391, 324/392; 340/870.37; 123/425

[56] References Cited

U.S. PATENT DOCUMENTS

| | | | |
|---|---|---|---|
| 3,820,013 | 6/1974 | Gaudette, Jr. et al. | 324/391 |
| 4,231,091 | 10/1980 | Motz | 123/414 |
| 4,406,265 | 9/1983 | Brandt et al. | 73/115 |
| 4,481,925 | 11/1984 | Karau et al. | 123/425 |
| 4,491,010 | 1/1985 | Brandt et al. | 73/714 |

*Primary Examiner*—Stewart J. Levy
*Assistant Examiner*—Robert R. Raevis
*Attorney, Agent, or Firm*—Robert M. Sigler

[57] ABSTRACT

Apparatus for sensing the timing of peak combustion pressure in an internal combustion engine includes a capacitive piezoelectric element adapted for flexure in response to variations in combustion chamber pressure and connected in parallel with a first resistance, a constant current generator connected to establish a predetermined voltage across the first resistance and thereby across the piezoelectric element when the capacitance of the latter remains constant, a second resistance, a source of the predetermined voltage, and an operational amplifier effective to compare the voltage across the piezoelectric element with the predetermined voltage and source or sink current through the second resistance to maintain the predetermined voltage across the piezoelectric element. The output voltage of the operational amplifier is an analog of the current through the second resistance and thus of the rate of change of capacitance of the piezoelectric element. The crankshaft angle after ignition at which this voltage crosses the predetermined reference corresponds to the timing of peak combustion pressure. In order to reduce noise in the 6 to 9 kilohertz range, the first and second resistances may be reduced, the second resistance bypassed at high frequencies and the output voltage amplified with low pass filtering.

3 Claims, 6 Drawing Figures

PEAK COMBUSTION PRESSURE TIMING DETECTOR FOR INTERNAL COMBUSTION ENGINE

BACKGROUND OF THE INVENTION

This invention relates to combustion control apparatus for an internal combustion engine and particularly to such apparatus which includes means effective to detect the timing, relative to crankshaft rotational position, of peak combustion pressure in an LPP ignition timing control. Such apparatus uses a pressure sensing device, generally of the indirect type such as the engine headbolt combustion pressure sensor shown in the U.S. Pat. No. 4,491,010, to Brandt et al issued Jan. 1, 1985. This sensor senses combustion pressure within the combustion chamber through its flexing effect on the engine head relative to the engine block. However, such flexure is necessarily small in amplitude; and the signal produced by a piezoelectric element is likewise small in amplitude and susceptible to noise. This is especially true since the peak must be detected and the true peak may be difficult to distinguish amid high frequency noise peaks. Thus the sensor must be designed for maximum amplitude response and well shielded against electrical noise in the engine compartment of the vehicle.

SUMMARY OF THE INVENTION

It is therefore an object of this invention to provide a peak combustion pressure timing detector with improved resistance to the deleterious effect of noise on the sensor output signal.

This and other objects are realized in apparatus for sensing the timing of peak combustion pressure in the combustion chamber of an internal combustion engine comprising, in combination, pressure sensing apparatus including a piezoelectric element adapted for flexure in response to variations in combustion chamber pressure, the piezoelectric element having a capacitance varying with said flexure, a first resistance connected electrically in parallel with the capacitance of the piezoelectric element with grounded and ungrounded junctions, constant current generating means adapted to supply a constant current to the ungrounded junction, the constant current being effective, when the capacitance remains constant, to establish a predetermined voltage across the first resistance and thereby across the capacitance, a second resistance, a reference voltage source effective to provide the predetermined voltage, an operational amplifier having an output connected through the second resistance to the ungrounded junction and through a third resistance to the grounded junction, an inverting input connected to the output through a feedback resistance and a non-inverting input connected to the reference voltage source, the operational amplifier thus comprising a variable current source and sink effective to maintain the predetermined voltage on the capacitance and output circuit means connected to the output of the operational amplifier, the voltage thereon corresponding to the derivative of the pressure sensed by the piezoelectric element and thus indicating the timing of peak combustion pressure as it passes through the predetermined voltage.

This apparatus provides a lower impedance load on the piezoelectric element, with the first resistance shunting electrical noise to ground to reduce such noise in the output signal. It thus eliminates the need for high impedance connectors and reduces the shielding requirements for connector, cable and sensor housing. Further details and advantages of this invention will be apparent from the accompanying drawings and following description of a preferred embodiment.

DESCRIPTION OF THE PREFERRED EMBODIMENT

Figure 1:
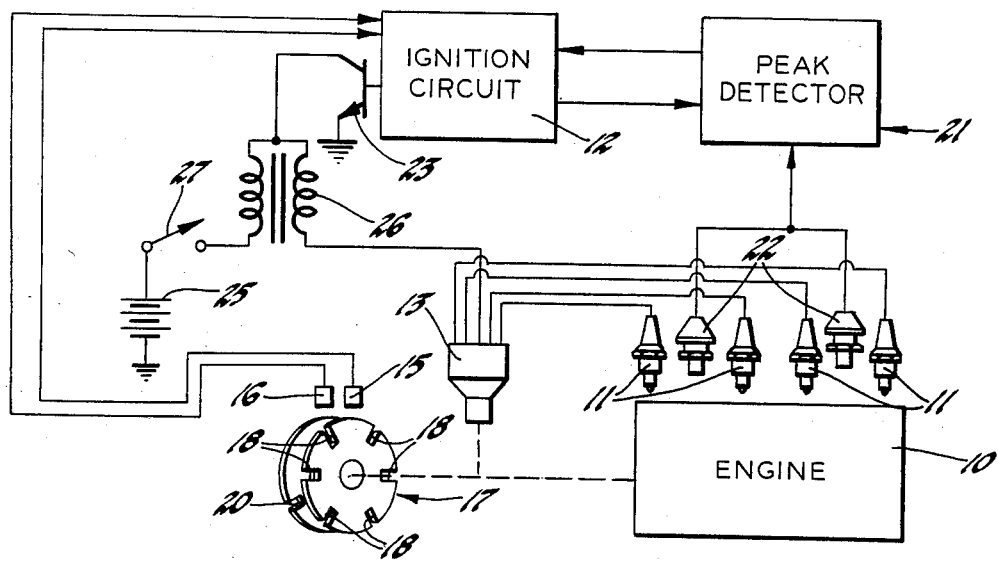
FIG. 1 shows a schematic drawing of an LPP ignition timing control for an internal combustion engine in which this invention may be used.

Referring to FIG. 1, an internal combustion engine 10 includes a plurality of combustion chambers, not shown, in which combustible charges are ignited by means of spark plugs 11 to generate power through the expansion of gases against pistons and cause rotation of an engine crankshaft, not shown, in the normal manner of such engines. An ignition circuit 12 generates spark firing pulses which are routed to the proper spark plugs 11 through a distributor 13 or similar apparatus as is common in the prior art. Ignition circuit 12 may comprise a programmed digital computer which receives input timing pulses from a magnetic pickup 15 and sync pulses from a magnetic pickup 16. Pickups 15 and 16 are associated with a notched wheel 17 having a plurality of timing pulse generating notches 18 and a sync pulse generating notch 20 associated with respective pickups 15 and 16 to generate the pulses therein. For example, wheel 17 may be part of the crankshaft counterbalance; and pickups 15 and 16 may be of the variable reluctance type. Notch 20 and its associated pickup 16 may be axially displaced slightly from notches 18 and pickup 15 to keep the signals separate. The position signals from such an arrangement may be made very accurate by placing the apparatus on a torsional vibration node of the crankshaft. An alternative arrangement is to provide vanes of a magnetic material on a wheel at the front of the engine crankshaft with Hall effect sensors. From these pulses, ignition circuit 12 determines a reference crankshaft position for the firing of each spark plug 11 in proper succession. In the case of a four cylinder engine and a six notch wheel which rotates twice during a complete cycle of all four cylinders, every third pulse generated by notches 18 will correspond to a new cylinder and two successive such notches mark a crankshaft angle of 60 degrees. Notch 20 provides a sync pulse to identify the individual timing pulses. The pulses from notches 18 and 20 are preferably used as the reference pulses for the entire ignition timing control for greatest accuracy; however, the normal distributor pulse generator may be used for the basic ignition timing reference pulses if necessary.

One or more combustion chamber pressure sensors 22 provide signals to a peak detector 21, which determines from said signals the location, relative to a TDC crankshaft reference, of peak pressure (LPP) for each ignition event, if possible, and generates a number representing LPP for output. Combustion pressure sensors 22 may be of any known type but may particularly be of the type comprising a head bolt for engine 10 in conjunction with a quartz force ring compressed thereunder or of the type in which the head bolt itself includes a piezoelectric element affixed to the bolt head for flexure therewith. A preferred form of the latter type of sensor is shown in the aforementioned patent to Brandt et al. In the case of a head bolt sensor, two sensors may suffice for the timing of a four cylinder engine, with one placed between cylinders 1 and 2 and the other placed between cylinders 3 and 4. The signals may be ORed together at the input to peak detector 21.

Ignition circuit 12 includes a microprocessor based digital computer programmed to compute from the successive input LPP values an average LPP value, determine ignition timing from this and other inputs as well as stored reference information and generate output ignition pulses at optimum times on the control electrode of an output power transistor 23 connected in series with a DC power source represented by vehicle battery 25, but understood to include all necessary components of a vehicle electrical power system. Transistor 23 is connected with battery 25 in the standard manner through the primary winding of a standard ignition coil 26 and the vehicle ignition switch 27. A secondary winding of ignition coil 26 is connected to provide high voltage pulses through distributor 13 to spark plugs 11 in the usual manner. Ignition circuit 12 may be based on that shown in the U.S. Pat. No. 4,231,091 to Moltz, issued Oct. 28, 1980, modified where necessary as described herein.

Ignition circuit 12 calculates, for each ignition event, the desired ignition timing relative to a reference engine crankshaft angle. Factors related to engine speed and load are stored in appropriate memory lookup tables and selected in response to the input of engine speed and load sensors as described in the Motz patent and other prior art references. This timing represents a stored ignition timing for the particular combination of engine speed and load, which is adjusted by a trim value derived from the LPP numbers received from peak detector 21.

Figure 2:
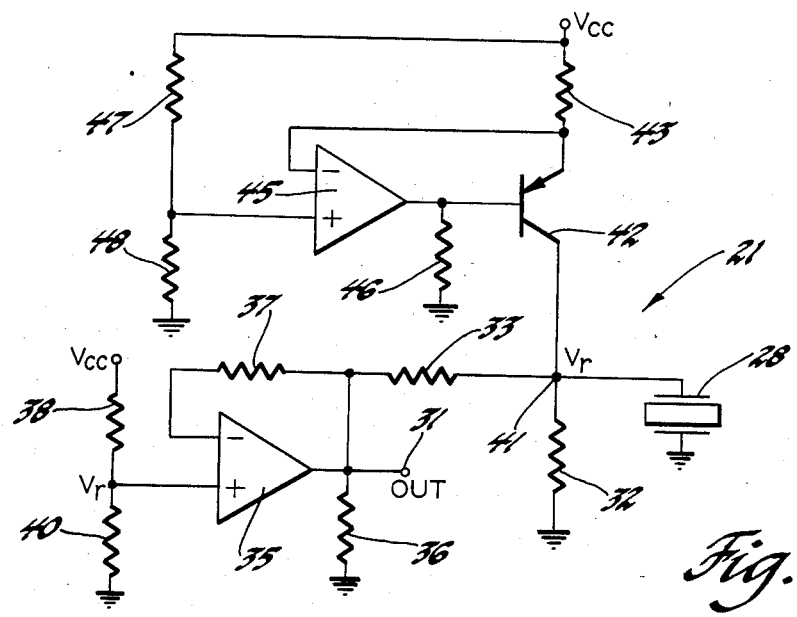
FIG. 2 shows a circuit diagram of an embodiment of this invention.
Figure 3:
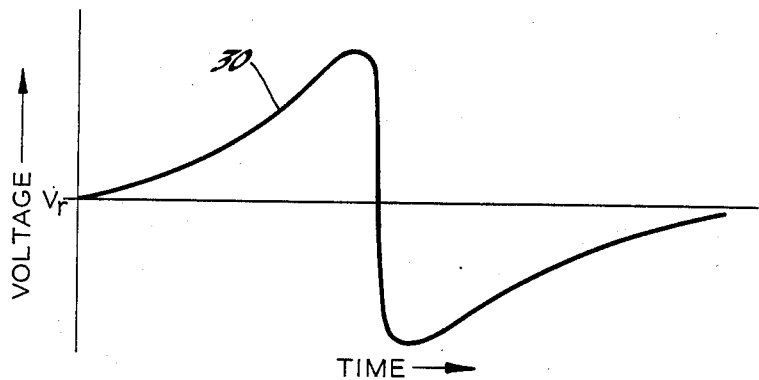
FIG. 3 shows an output signal waveform for the embodiment of FIG. 2.

FIG. 2 shows a first embodiment of peak detector 21. In FIG. 2, piezoelectric element 28 is the aforementioned piezoelectric element in sensor 22 which generates the pressure signal. One way to understand the effect of flexure of piezoelectric element 28 is to consider the element as a variable capacitance. As element 28 is flexed, the capacitance varies as the first derivative or rate of change of the amount of flexing and therefore of the combustion chamber pressure. As the pressure in the combustion chamber rises to a peak and subsides, the curve of capacitance vs. time of element 28 will be similar in shape to curve 30 of FIG. 3, with a particular reference capacitance indicating the precise zero derivative or peak level of the pressure. The circuit of FIG. 2, therefore, is designed to sense the capacitance of element 28 and generate a voltage analog thereof, as shown in the curve of FIG. 3, on an output terminal 31.

The general method of operation of the circuit of FIG. 2 is to maintain a constant voltage across the capacitance of piezoelectric element 28 by sourcing or sinking current thereto, sense the direction and amplitude of the required current and develop a voltage analog of that current. To this end, piezoelectric element 28 has one end grounded and the other end connected through a first resistor 32 (100 K) to ground and through a second resistor 33 (1 M) to the output of an operational amplifier or op amp 35. The output of op amp 35 is connected to ground through a resistor 36 (5.1 K) and back to its inverting input through a feedback resistor 37 (6.8 K). The non-inverting input of op amp 35 receives a reference voltage $V_r$ from a voltage divider comprising series resistors 38 (10 K) and 40 (20 K) connected between supply voltage $V_{cc}$ (+15 volts) and ground. Reference voltage $V_r$ is set equal to the desired voltage across piezoelectric element 28, 10 volts. As the voltage across piezoelectric element changes, therefore, op amp 35 senses the changes and changes its output voltage to source or sink the current required to oppose these changes and thus maintain a substantially constant voltage thereacross. If the voltage on junction 41 of resistors 32 and 33 and piezoelectric element 28 is considered to be substantially constant, the voltage at the output of op amp 35 causes a voltage drop across resistor 33 to create the sourcing or sinking current which is the analog of changing capacitance of piezoelectric element 28. The output voltage of op amp 35 is therefore also an analog of this capacitance; and the output terminal 31 is therefore the output of op amp 35.

In order to provide the continuous current necessary to maintain a predetermined voltage across the capacitance of piezoelectric element 28 and not require op amp 35 to supply the entire current, a current source provides a separate constant current through resitor 32. This source comprises a PNP transistor 42 (2N4403) having an emitter connected through a resistor 43 (30 K) to supply voltage $V_{cc}$ and a collector connected to junction 41. The base of transistor 42 is connected to the output of an op amp 45 and further through a resistor 46 (5.1 K) to ground. Op amp 45 has an inverting input connected directly to its output and a non-inverting input connected to a voltage divider comprising series resistors 47 (10 K) and 48 (40 K) across the supply voltage $V_{cc}$ and providing a constant reference voltage to that input. Resistors 47 and 48 are picked to determine an operating point for transistor 42 which provides current through resistor 32 to generate voltage $V_r$ thereacross with no current through resistor 33. Thus a higher voltage $V_r$ may be maintained across the piezoelectric element 28 without having all the current required for maintaining that voltage flow through resistor 33. This enables resistor 33 to be increased in resistance to more greatly amplify the output signal at terminal 31.

When the circuit of FIG. 2 was tested, it was discovered that, although the output amplitude was adequate for detection in a low to average noise environment, the desired signal was mixed with a large noise component in the 6 to 9 kilohertz range. Since the circuit differentiates the pressure signal, noise in this frequency range was being amplified 100 times more than the desired signal. Therefore the circuit was modified to load the piezoelectric element with a smaller parallel impedance by reducing resistors 32 and 33 by a factor of 100 and using an additional amplifier to regain the consequent loss in AC current amplification in resistor 33. The result is another peak detector embodiment 21', shown in FIG. 4.

Figure 4:
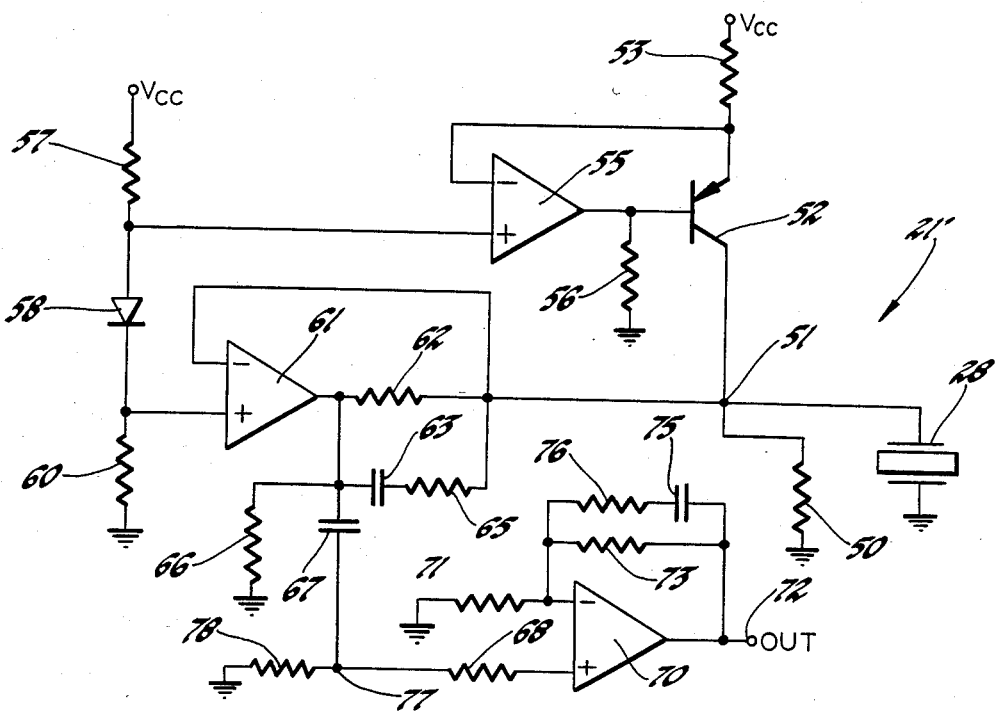
FIGS. 4 and 5 show circuit diagrams of alternative embodiments of this invention.

Referring to FIG. 4, Piezoelectric element 28 is identical to the same element in the circuit of FIG. 2 and is connected in parallel with a resistor 50 (1 K, 1%) between ground and a junction 51. A constant current source comprises PNP transistor 52 (2N4403) having a collector connected to junction 51, an emitter connected through a resistor 53 (510, 1%) to supply voltage $V_{cc}$ (+15 volts) and a base connected to the output of an op amp 55 and through a resistor 56 (5.1 K) to ground. The output of op amp 55 is also connected directly to its inverting input; and the non-inverting input is connected to a voltage divider comprising a resistor 57 (510, 1%), diode 58 (1N914) and resistor 60 (1 K, 1%) connected in series between supply voltage $V_{cc}$ and ground, the connection being between resistor 57 and diode 58.

Op amp 61 has a non-inverting input connected between diode 58 and resistor 60, an inverting input connected to junction 51 and an output connected to junction 51 through a resistor 62 (100 K) and, in parallel therewith, through a series capacitor 63 (0.0015 uF) and resistor 65 (1 K). The output of op amp 61 is also connected through a resistor 66 (5.1 K) to ground and through a series capacitor 67 (2.2uF) and resistor 68 (200 K) to the non-inverting input of an op amp 70. Op amp 70 has an inverting input connected to ground through a resistor 71 (20 K) and an output comprising an output terminal 72 connected back to the inverting input through a feedback network comprising a resistor 73 (200 K) in parallel with the series combination of a capacitor 75 (1000pF) and resistor 76 (1 K). The junction 77 of capacitor 67 and resistor 68 is connected to ground through a resistor 78 (1 M).

In the operation of the circuit of FIG. 4, op amp 61 and its associated components are responsive to the voltage on junction 51 to provide the variable current necessary to maintain that voltage substantially constant. Capacitor 63 allows high frequency (above 6 kilohertz) noise components to bypass current amplifying resistor 62. The output voltage of op amp 61 is amplified by the amplifier comprising op amp 70 and its associated components, which include substantial filtering to further reduce the noise components in the 6 to 9 kilohertz range. The result is a signal with a better signal to noise ratio at output terminal 72.

Figure 5:
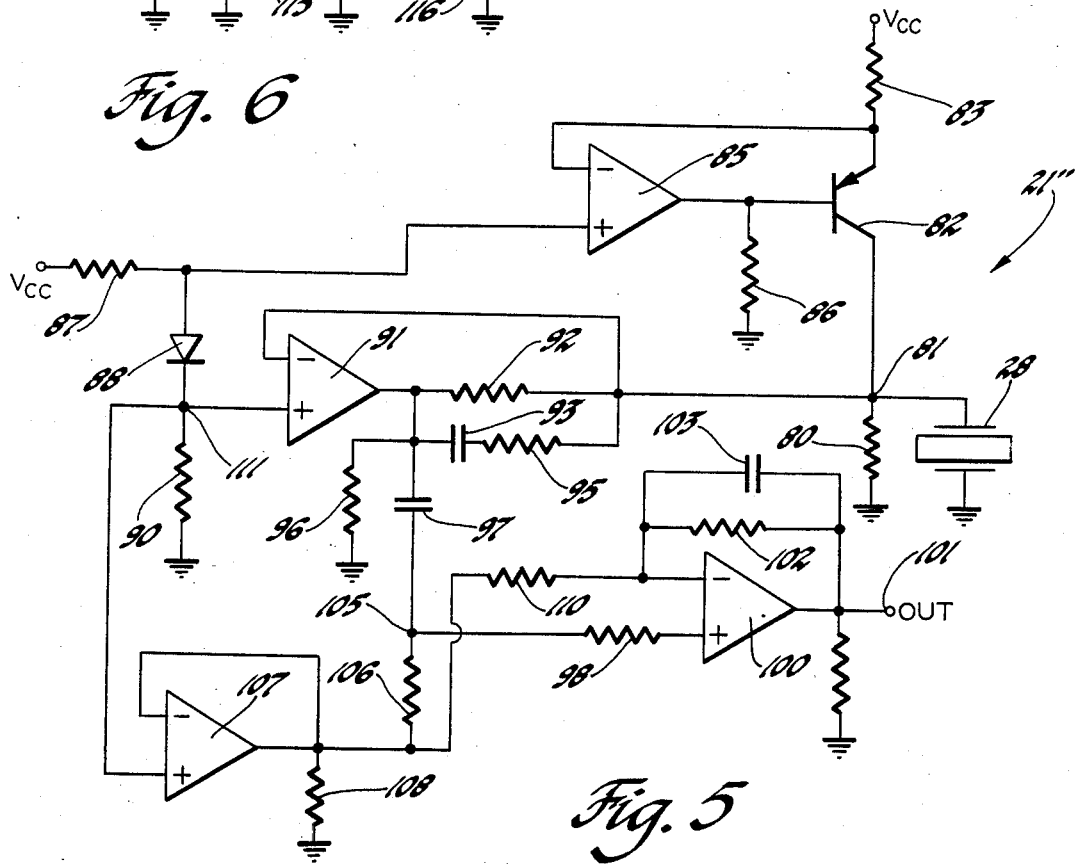

FIG. 5 shows an alternative embodiment 21'' for the circuit of FIG. 4 which is designed for use with an 8 volt, rather than a 15 volt, power supply, former being more appropriate for a motor vehicle. Referring to FIG. 5, Piezoelectric element 28 is identical to the same element in the circuit of FIGS. 2 and 4 and is connected in parallel with a resistor 80 (4 K, 1%) between ground and a junction 81. A constant current source comprises PNP transistor 82 (2N4403) having a collector connected to junction 81, an emitter connected through a resistor 83 (4 K, 1%) to supply voltage $V_{cc}$ (+8 volts) and a base connected to the output of an op amp 85 and through a resistor 86 (5.1 K) to ground. The output of op amp 85 is also connected directly to its inverting input; and the non-inverting input is connected to a voltage divider, comprising a resistor 87 (1 K, 1%), diode 88 (1N914) and resistor 90 (1 K, 1%) connected in series between supply voltage $V_{cc}$ and ground, between resistor 87 and diode 88.

Op amp 91 has a non-inverting input connected between diode 88 and resistor 90, an inverting input connected to junction 81 and an output connected to junction 81 through a resistor 92 (39 K) and, in parallel therewith, through a series capacitor 93 (3300 pF) and resistor 95 (1 K). The output of op amp 91 is also connected through a resistor 96 (5.1 K) to ground and through a series capacitor 97 (2.2uF) and resistor 98 (10 K) to the non-inverting input of an op amp 100. Op amp 100 has an output comprising an output terminal 101 connected back to the inverting input through a feedback network comprising a resistor 102 (200 K) in parallel with a capacitor 103 (1000pF).

The junction 105 of capacitor 97 and resistor 98 is connected through a resistor 106 (100 K) to the output of an op amp 107, which output is connected to ground through a resistor 108 (10 K), to the inverting input of op amp 100 through a resistor 110 (10 K) and directly to the inverting input of op amp 107. The non-inverting input of op amp 107 is connected to junction 111 of diode 88 and resistor 90.

Figure 6:
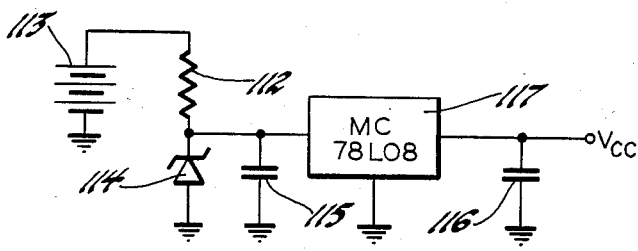
FIG. 6 shows a circuit diagram of an electric power supply for use with the circuit of FIG. 5.

FIG. 6 shows a power supply for generating the 8 volt supply voltage $V_{cc}$ required for the circuit of FIG. 5. A power supply chip 117 (78L08) has an input connected through a resistor 112 (100 ohms) to a vehicle 12 volt power supply 113 and also through a 16 volt zener diode 114 in parallel with a capacitor 115 (10uF) to ground. The output is connected through a capacitor 116 (33uF) to ground and provides the regulated voltage $V_{cc}$ of 8 volts.

The embodiments of the invention in which an exclusive property or privilege is claimed are defined as follows:

1. Apparatus for sensing the timing of peak combustion pressure in the combustion chamber of an internal combustion engine comprising, in combination:
   pressure sensing apparatus including a piezoelectric element adapted for flexure in response to variations in combustion chamber pressure, the piezoelectric element having a capacitance varying with said flexure;
   a first resistance connected electrically in parallel with the capacitance of the piezoelectric element with grounded and ungrounded junctions;
   constant current generating means adapted to supply a constant current to the ungrounded junction, the constant current being effective, when the capacitance remains constant, to establish a predetermined voltage across the first resistance and thereby across the capacitance;
   a second resistance;
   a reference voltage source effective to provide the predetermined voltage;
   an operational amplifier having an output connected through the second resistance to the ungrounded junction and through a third resistance to the grounded junction, an inverting input connected to the output through a feedback resistance and a non-inverting input connected to the reference voltage source, the operational amplifier thus comprising a variable current source and sink effective to maintain the predetermined voltage on the capacitance; and
   output circuit means connected to the output of the operational amplifier, the voltage thereon corresponding to the derivative of the pressure sensed by the piezoelectric element and thus indicating the timing of peak combustion pressure as it passes through the predetermined voltage.

2. Apparatus according to claim 1 wherein the engine generates significant noise in the frequency range of 6 to 9 kilohertz, the apparatus further including low pass filter means effective to reduce the gain of the 6 to 9 kilohertz components of the voltage appearing on the output circuit means compared to the lower frequency components of the same voltage, whereby the passing of the voltage through the predetermined voltage is more easily detected.

3. Apparatus according to claim 2 in which the second resistance has a comparatively low-resistance value less than 100 kilohms for low voltage variations thereacross and is provided with a bypass capacitor to further reduce the effect of voltage variations thereacross above 6 kilohertz, the apparatus further including voltage amplification means in the output circuit means, the voltage amplification means having associated additional low pass filter elements to reduce gain above 6 kilohertz but having gain effective to amplify the low voltage variations across the second resistance of less than 6 kilohertz.

* * * * *